(12) United States Patent
Espinosa et al.

(10) Patent No.: US 7,805,705 B2
(45) Date of Patent: Sep. 28, 2010

(54) GRAPHICALLY DEPICTING PROGRAM CODE DEPTH

(75) Inventors: Christopher Espinosa, Menlo Park, CA (US); Andreas Wendker, Mountain View, CA (US); David Ewing, Longmont, CO (US); Maxwell O. Drukman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1043 days.

(21) Appl. No.: 11/462,628

(22) Filed: Aug. 4, 2006

(65) Prior Publication Data
US 2008/0052670 A1 Feb. 28, 2008

(51) Int. Cl.
*G06F 9/44* (2006.01)
(52) U.S. Cl. ........................ 717/110; 717/111; 717/112; 717/113
(58) Field of Classification Search ................. 717/110, 717/111, 112, 113; 715/700, 711, 713, 762, 715/763
See application file for complete search history.

(56) References Cited

U.S. PATENT DOCUMENTS

| 6,356,285 | B1 * | 3/2002 | Burkwald et al. | ........... 717/125 |
| 2002/0184611 | A1 * | 12/2002 | Endejan | ....................... 717/113 |

OTHER PUBLICATIONS

Zhang, et al. "An interactive, visual simulator for the DLX pipeline", 1997, ACM, p. 1-4.*

* cited by examiner

*Primary Examiner*—Wei Y Zhen
*Assistant Examiner*—Qamrun Nahar
(74) *Attorney, Agent, or Firm*—Fish & Richardson P.C.

(57) ABSTRACT

Systems and methods for graphically depicting program depth are provided. Systems and methods can include generation of an edit pane and a ribbon column. The edit pane displays the program code, while a ribbon column displays the depth of an associated row of program code.

26 Claims, 9 Drawing Sheets

GRAPHICALLY DEPICTING PROGRAM CODE DEPTH

BACKGROUND

This disclosure relates to programming code.

Programmers typically program in any of a variety of high level programming languages. High level programming languages were developed to give programmers an abstracted mechanism with which to instruct a processor to perform various actions. These abstracted mechanisms are typically more easily understood and recognized by humans. Moreover, and beyond mere programming abstraction, the use of higher level programming languages has allowed programmers to develop various paradigms to facilitate interaction with the program code by others, whether it be to improve the program code, to debug the program code, or to adapt the program code to a specific use.

A program code editor is a tool that can be used to review and make changes to program code. Editing program code by a person who did not originally produce the code can be difficult. For example, it can be difficult to determine the depth or indentation of a program code segment, because a particular segment of program code may be far removed from the previous corresponding indentation. Moreover, in some examples, various indentation and formatting paradigms may be completely ignored (intentionally or unintentionally) by a programmer, sometimes in favor of the programmer's own preference(s). Such program code can be difficult to read and/or debug because of the aforementioned formatting irregularities.

SUMMARY

In one aspect of this disclosure methods are disclosed which provide a graphical indication of coding depth by, for example: providing an editing pane for editing program code, the program code including a depth associated with various segments of program code; generating a ribbon column based upon the depth of the program code, the ribbon column including a graphical representation of the depth of associated segments of program code; and, displaying the ribbon column and the editing pane.

In another aspect of this disclosure systems are disclosed for editing code. Such systems can include an edit pane generator, a ribbon column generator, and a user interface engine. The edit pane generator can be configured to generate an edit pane for use in editing program code. The ribbon column generator can be configured to generate a ribbon column based upon a depth associated with the program code. The ribbon column can include a graphical representation of the depth of corresponding segments of program code. The user interface can be configured to display an edit pane in conjunction with the ribbon column.

In other aspects of this disclosure, systems and methods that provide a graphical indication of programming depth can include computer readable media having instructions that upon execution by a system processor cause the system processor to, for example: provide an editing pane for editing program code, the program code including segments; analyze the program code for a depth associated with the segments of the program code; generate a ribbon column based upon the depth of the program code, the ribbon column including a graphical representation of the depth of segments of program code; and, display the ribbon column separately from the editing pane.

In still further aspects of this disclosure methods for providing a graphical indication of programming depth can include: providing an editing pane for editing program code, the program code including segments; analyzing the segments of the program to determine a depth associated with the segments of program code; generating a ribbon column based upon the depth of the segments of program code, the ribbon column including a graphical representation of the depth of associated segments of program code; and, displaying the ribbon column and the editing pane An editor as described can facilitate ease of interaction during the edit process, even where program code does not follow formatting paradigms or is too long or complicated to show formatting even where present.

An editor as described can also facilitate conformity to a formatting paradigm through visual feedback to a programmer.

An editor as described can further facilitate proper understanding of program code through analysis of the syntax and structure of the program code, instead of analysis of white space associated with the program code.

BRIEF DESCRIPTION OF THE DRAWINGS

FIG. 6 is a screenshot illustrating an example of a program code editing system whereby a programmer can select a depth from a ribbon column and edit program code at the selected depth.

DETAILED DESCRIPTION

Figure 1:
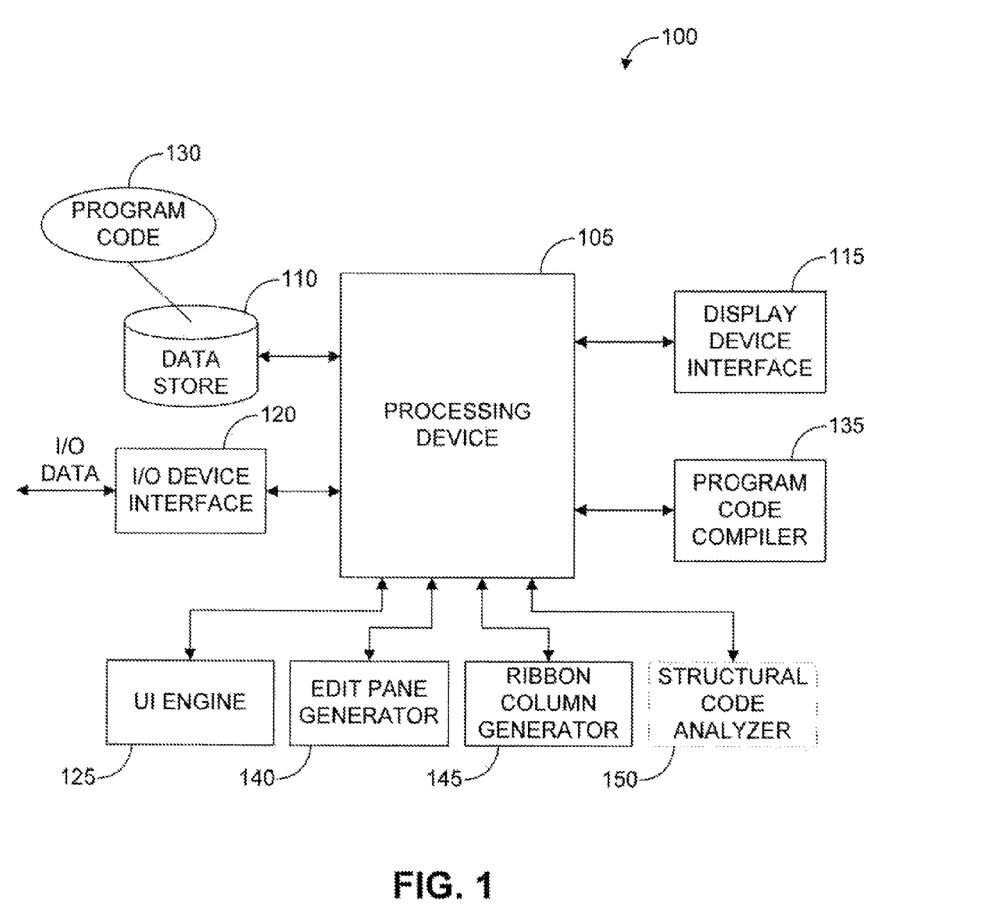
FIG. 1 is a block diagram of an exemplary program code editing system having an editing pane generator and a ribbon column generator.

FIG. 1 is a block diagram of an exemplary program code editing system 100. Program code editing system 100 can include a myriad of types of computers, terminal devices with remote processing capability, or any other system components that are operable to perform the editing functions described below. As shown, the program editing system 100 includes a processing device 105 and various components for manipulating program code 130. Other system configurations are possible. As should be understood, various electronic components (e.g., desktop, laptop, client or server computers) can be used, for example, to draft and edit program code.

In the example of FIG. 1, the program code editing system 100 is implemented in a computer. The program code editing system 100 can include, for example, a processing device 105, a data store 110, a display interface 115, and other input/output (I/O) device interfaces 120, through which I/O data can be received or transmitted. I/O devices of various examples can include a network interface from an internet service provider (ISP), for example, an external hard drive, a power supply, a keyboard, a media player and/or recorder, etc. Other I/O devices that can be used to facilitate the editing processing can be included. A display (not shown) can be considered an output device. The display usually comprises a user interface, such as a graphical user interface, among others. A user interface that can be presented on the display may be generated by a user interface (UI) engine 125. The UI engine 125 receives commands from other engines (described below), and instructs the display to draw the screen. Moreover, the UI engine 125 can be configured to receiver user input via a myriad of input devices, such as a keyboard, a mouse, a microphone, etc.

In this example, the data store 110 can store program code 130 comprising an ordered set of instructions. As should be understood, program code 130 is typically not executable by a computer. Instead, the program code is compiled by a program code compiler 125. The compiler 135 creates compiled code that may also be stored in the data store 110 for later execution by the processing device 105.

Program code editing system 100 includes an editing pane generator 140 and a ribbon column generation 145. The editing pane generator 140 produces an editing pane, which allows a programmer to edit the program code using the user interface engine 125. Editing pane editor 140 and ribbon column generator 145 can be separate programs, or part of a larger package of programs which operate together to provide a combined editor and compiler. In one implementation, the editing pane generator 140 is of the form of a conventional text editor that is used in conjunction with the ribbon column generator 145. However, in other exemplary implementations, the editing pane generator includes various graphical indicators of program depth. For example, in some implementations the editing pane generator can enable editing of a piece of the program code based upon a selection received using the ribbon pane. In other implementations, the edit pane generator can alter the colors associated with the text based upon a depth selection received from a user using a ribbon pane.

The ribbon column generator 145, in some examples, generates a column having a graphical indication of program code depth for display alongside an editing pane. The graphical indication can include a variety of forms, including color coding, symbol coding, grayscale coding, among many others. The ribbon column is configured to include a graphical indication that corresponds to a similarly placed section of code. For example, in some implementations, the ribbon column is drawn to the left and alongside of the editing pane. The ribbon column of such an example includes several rows, each of which correspond to a similarly situated tow of the editing pane.

In some examples, the ribbon column generator 145 can assign a color to each of the rows based upon an indentation of the corresponding row of program code. In alternative examples, the ribbon column generator 145 can also include a structural code analyzer 150 which can analyze the structure of program code without regard to white space (e.g., indentation) and assign a depth to each of the lines of code based upon the analysis. Such an implementation can be preferable based upon the extent to which the programmer has or has not indented his or her code or conformed to a coding paradigm. Such structural analysis can alert a programmer to an indentation mistake which could save hors in the debugging process searching for a piece of code that has been improperly indented.

In yet further examples, the ribbon column generator 145 can be programmed to receive a user selection from the user interface engine 125. The user selection can request that a portion of the code be made editable by the editing pane generator 140. The ribbon column generator 145 can flag the selected depths and request that the editing pane generator 140 highlight the corresponding rows associated with the selected depths. IN one implementation, the user can select a depth from the ribbon column, and the ribbon column generator 145 can analyze the ribbon column and request that all rows at equal or lower depth to the selected depth be enabled for editing. Further, in some examples, enabling a portion of the program code for editing can include highlighting the portion of program code, such as by shading out a portion of program code not selected, for example. Moreover, the highlighted portion of code could be shown in white at the selected level, and each successively lower level can be shaded darker, colored, or otherwise graphically noted.

Figure 2:
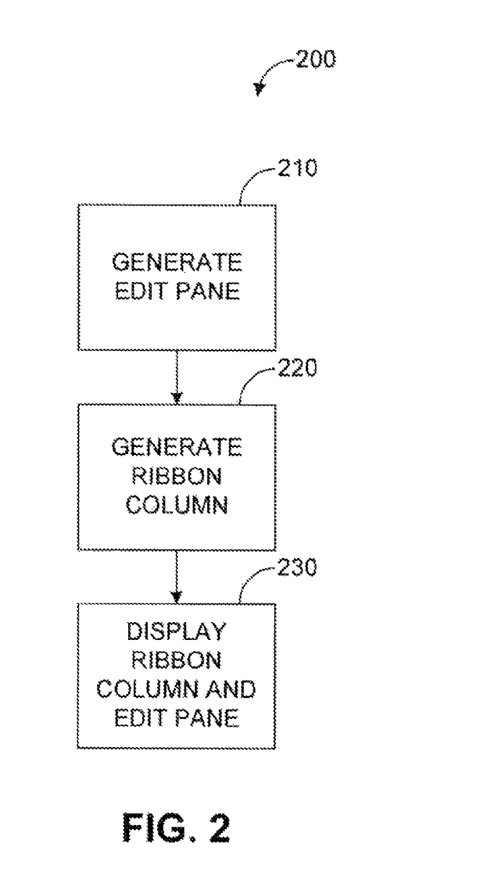
FIG. 2 is a flowchart illustrating an exemplary method for program code editing systems and methods.

FIG. 2 depicts an method 200 for program code editing. The method 200 begins at step 205 with the designation of program code for editing and invocation of an editor. At step 210 the method 200 generates and edit pane (e.g., using editing pane editor 140). The method 200 continues at step 220 by generating a ribbon column (e.g., using ribbon column generator 145). The ribbon column can be generated in a variety of different ways, including based upon program code indentation or depth, and that the ribbon column can include, for example, color coding, grayscale coding, symbolic coding, etc., to designate different program code depths. The method 200 concludes at step 230 by displaying the edit pane and the ribbon column to the programmer.

Figure 3:
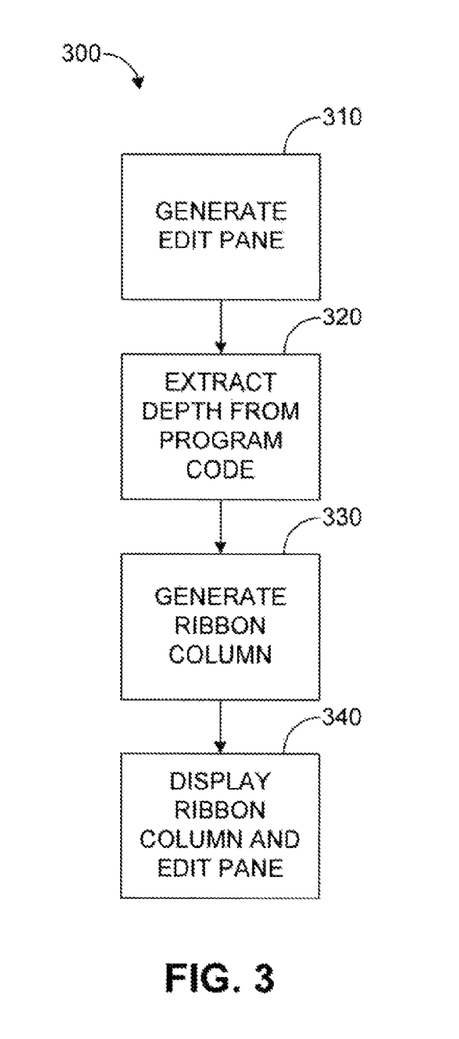
FIG. 3 is a flowchart illustrating an exemplary method for program code editing systems and methods, including extracting depth information from program code.

FIG. 3 depicts an alternative method 300 for program code editing. The method 300 begins with the designation of program code for editing and invocation of an editor. The method continues with the generation of an editing pane (e.g., by editing pane editor 14), as shown by step 310. In step 320, the method 300 extracts program depth from the program code (e.g., by structural code analyzer 150). The program code depth can be extracted by examining the structure of the program code, such as, for example the procedure calls, comments, and/or routine calls, and determining how a particular portion of program code could be nested in comparison to other segments of program code.

As shown by step 330, the method 300 then generates a ribbon column (e.g., by ribbon column generator 145). The ribbon column is based upon the extracted depth from step 320. The ribbon column can include a graphical indication of the depth of a particular segment of program code. The graphical indication in some examples, can include a color coding of depth. For example, more intense colors can indicate a deeper segment of program code, while less intense colors can indicate a shallower segment of program code. The method 200 concludes at step 340 by displaying the editing pane and the ribbon column on a display device.

Figure 4:
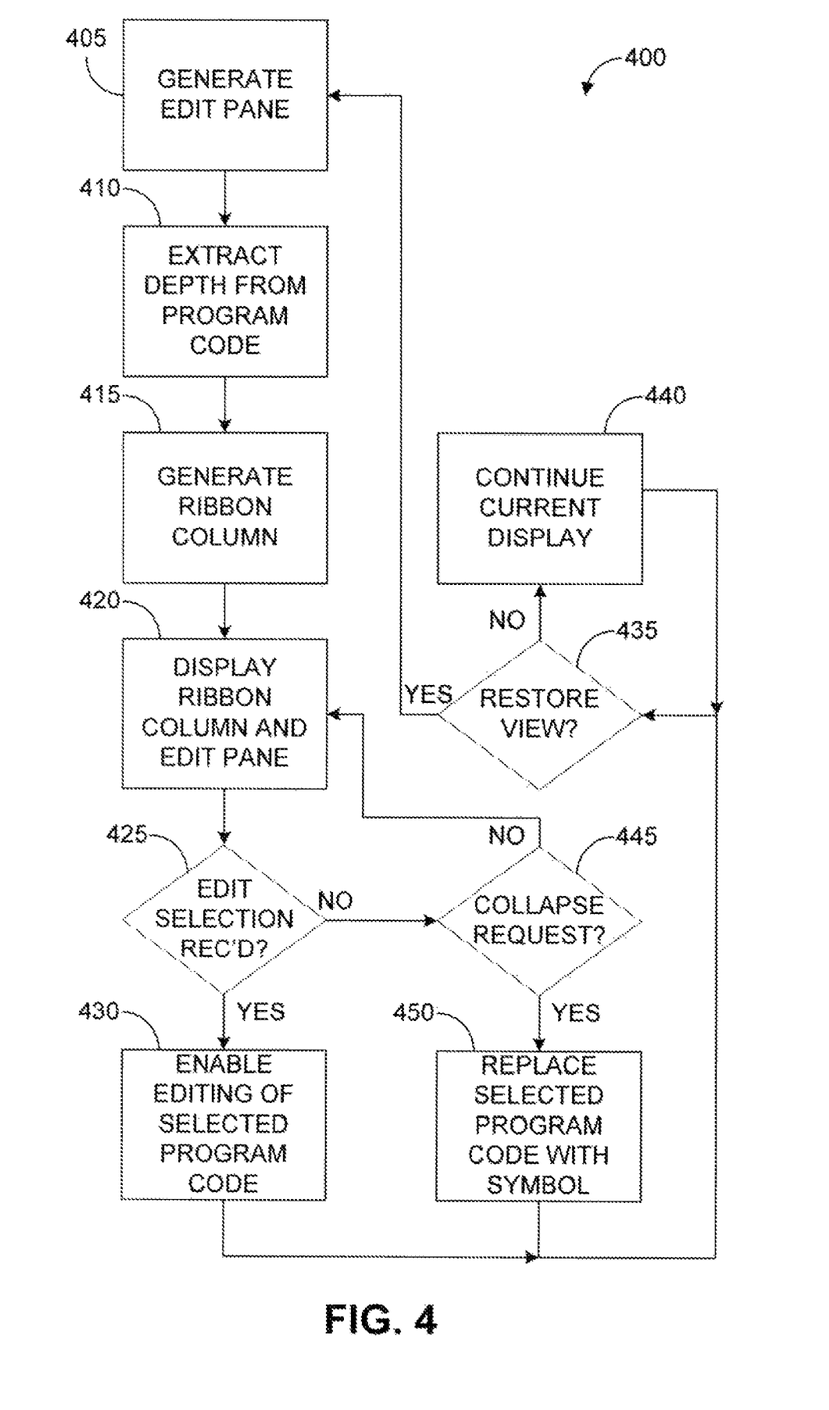
FIG. 4 is a flowchart illustrating an alternative method for program code editing systems and methods.

FIG. 4 shows another method 400 for program code editing. The method 400 begins at step 405 designating program code for editing and invoking an editor. The method continues at step 407 by generating an editing pane (e.g., by editing pane editor). In one implementation, the editing pane can be generated using a generic text editor, or alternatively using a specialized editor for editing program code. Specialized editors can include color coding for statements, procedure calls, comments, etc., while generic editors can be configured to use plain text so as not to confuse a compiler with text formatting that may not be recognized by the compiler.

At step 410, the method 400 extracts program depth from the program code. The program code depth can be extracted by analyzing the structure of the program code (e.g. by structural code analyzer 150). Program code analysis can include examining the procedure and routine calls and determining how a particular portion of program code is structured in comparison to other segments of program code.

The method 400 then generates a ribbon column as shown in step 415 (e.g. by ribbon column generator 145). The ribbon column can be based upon the extracted depth from step 420. The ribbon column can include a graphical indication of the depth of a particular segment of program code. The graphical indication in some examples, can include a color coding of depth. For example, more intense colors can indicate a deeper segment of program code, while less intense color can indicate a shallower segment of program code. Other indications and other indication schemes are possible. IN a grayscale coding used in some examples, darker colors can be used to indicate deeper segments of code, while lighter colors can indicate shallower segments of code. In one implementation, the user can specify the coding used for indicating the depth associated with various program code segments.

At step 420, the method 400 displays the ribbon column and edit pane. The ribbon column and edit pane are displayed side-by-side in some implementations. The ribbon column and edit pane can be aligned such that the coded depths as indicated by the ribbon column correspond to the correct program code segments displayed in the edit pane.

At step 425, the method determines whether an edit selection has been received. In some examples, the programmer can select a program code depth by using a mouse pointer representation to select a depth from the ribbon column. Similarly, a programmer can select a depth from the edit pane, and enable an associated portion of the program code available for editing. IN one implementation, upon selecting the program code depth, the method makes all program code at equal or lower depths editable in edit pane, as shown by step 430.

In various examples of enabling the edit pane, the method 400 can shade over any segments of code that have been excluded by the depth selection. Alternatively, the method 400 can highlight a particular portion of the edit pane associated with the selected depths of program code, thereby alerting the user to which of the portions of program code are enabled for editing. Moreover, in some implementations the method can further highlight lower depths of code within the highlighted portion of code. For example, the main selected code depth can be highlighted by a white screen, while lower program coded depths can be shaded successively darker for each lower depth encountered in the edit pane.

The method 400 can determine whether a request to restore the original view (e.g., remove highlights or shading) has been received from a user interface, as shown instep 435. If a request to restore the original view has been received, the method returns to step 420. However, if there has been no request to restore the original view, the method 400 continues the current display, as shown by step 440.

Returning to step 425, if no edit selection is received the method 400 determines whether a request to collapse a segment of code has been received, as shown by step 445. Upon receiving a request to collapse a segment of code, the method replaces a selected segment of code with a symbol, such as an ellipsis. In some implementations, the request to collapse of a segment of program code is based upon user input. However, in other implementations, a request to edit a segment of the program code could be treated as a request to collapse other segments of program code. Thus, segments of the program code could be collapsed when these segments are no selected for editing. The expanded section of code can be stored in memory, such that the segment of code is still available for viewing, manipulation, reinsertion etc., upon receiving a request to restore the original view, as shown by steps 435 and 440.

Figure 5:
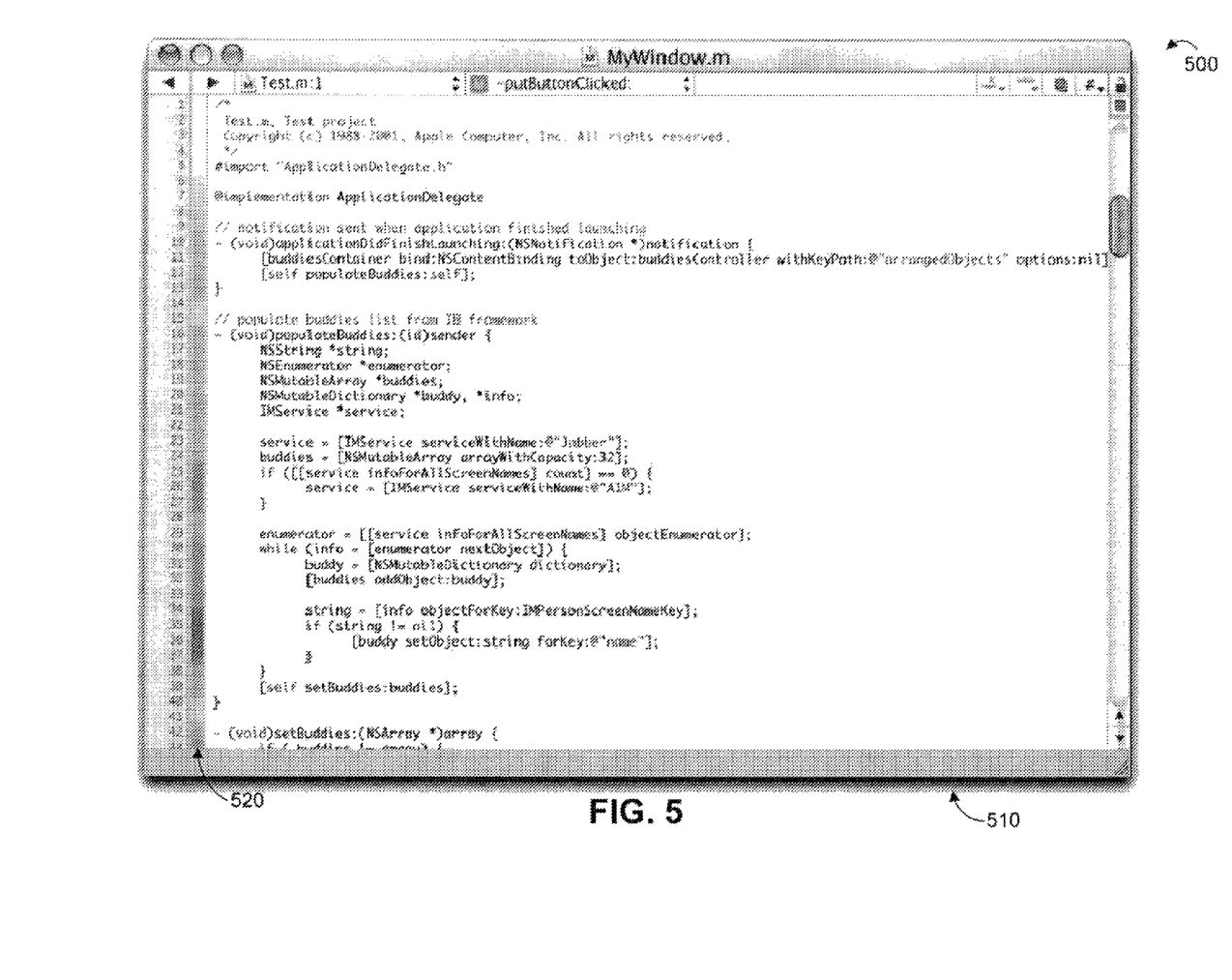
FIG. 5 is a screenshot illustrating an example of a program code editing system which includes an example editing pane and an example ribbon column of a program code editing system.

FIG. 5 depicts an example screen shot 400 displaying an editing pane 510 and a ribbon column 510. The editing pane 510 includes a display of program code. The program code includes a number of lines of code, which can be grouped into program code segments and sub-segments. As shown, the ribbon column 520 includes a grayscale representation of program code depth for a particular line of program code displayed by the editing pane 510. As shown, the ribbon column color coding is based upon the depth of the associated program code segment, which allows programmers to get a better understanding of whether a segment of code is above or below another segment of non-contiguous code. Such an understand is sometimes difficult to obtain when viewing indentation alone. In this example, the darker grayscale indicates deeper program codes segments, while lighter grayscale indicated shallower program code segments. Other shading schemes are possible.

FIG. 6 depicts an example screenshot 600 showing an edit pane 610 with parts of the edit pane 610 being enabled by the selection of a depth from the ribbon column 620. The selected area for edit is indicated in the ribbon column by a selection indicator bar 630. The selection indicator bar 630 of this example shows all program code at or below the depth selected from the ribbon column 620. The selection indicator bar 630 also includes shading for program code depths that are lower than the selected program coded depth. Further, in this example, the edit pane 610 shades out program code that is separate from the selected program code depth. Additionally, the edit pane 610 in this example marks depths that are lower than the selected depth by shading the portions of program ode that are lower in depth that the selected depth. Moreover, while the shading in this example alternates between white and shaded, deeper depths of program code can be shaded successively darker.

Figure 7:
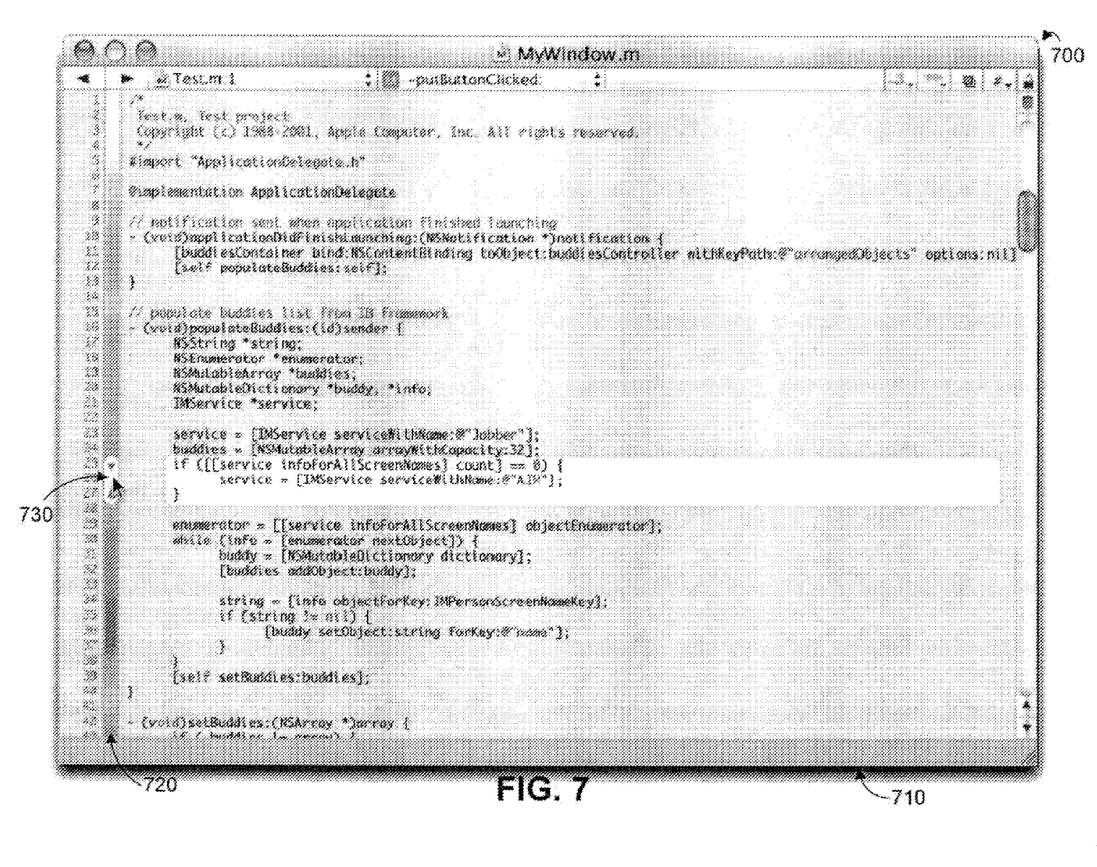
FIG. 7 is a screenshot illustrating an example of a program code editing system whereby a programmer can select a different depth from a ribbon column and edit program code at a different depth.

FIG. 7 depicts an example screenshot 700 showing an edit pane 710 and a ribbon column 720. The ribbon column 720 of this example includes another example where a portion of the code for editing has been selected by selecting a program code depth from the ribbon column 720, which is indicated by a selection indicator bar 730. The selection indicator bar 730 of this example shows all program code at or below the depth selected from the ribbon column 720. However, because there is no contiguous code below this level, only a single segment of code is selected. Further, in this example, the edit pane 710 highlights the selected program code depth.

Figure 8:
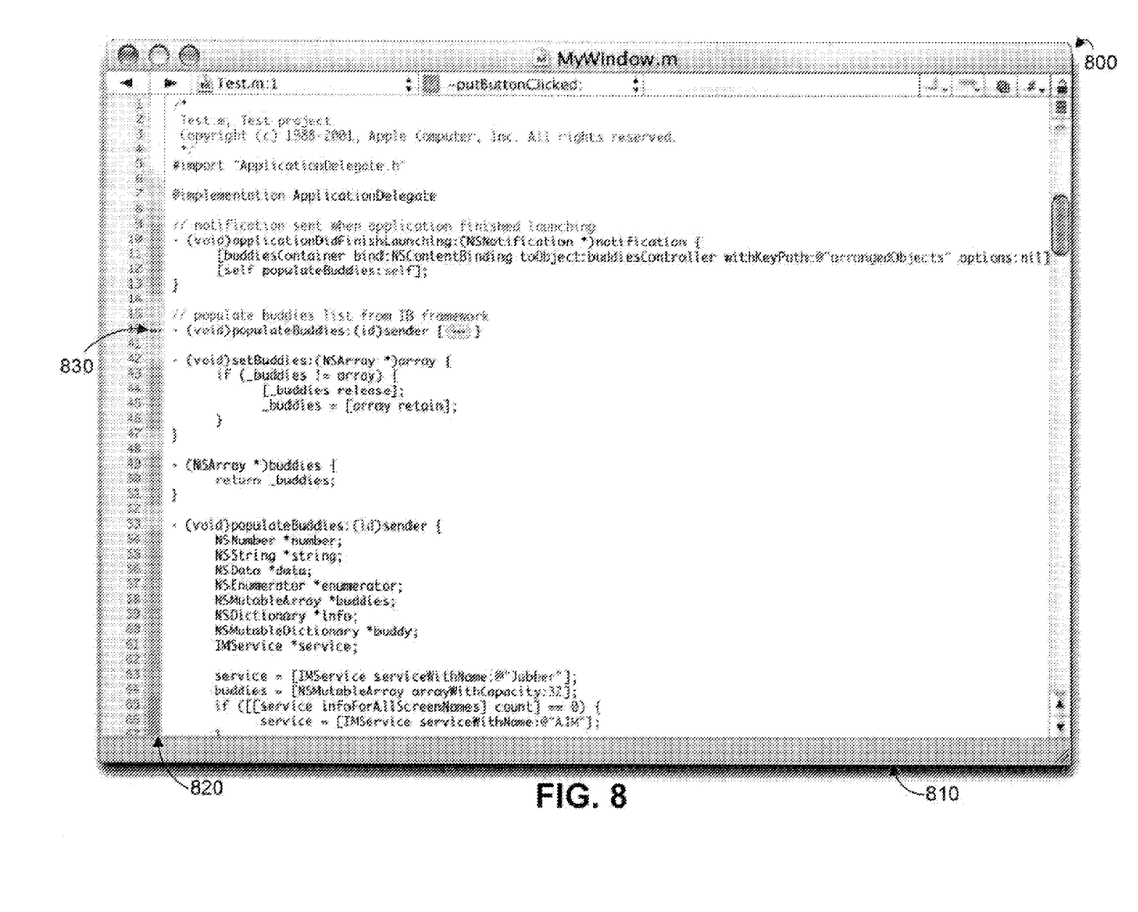
FIG. 8 is a screenshot illustrating an example of a program code editing system whereby a programmer can select a portion of code based upon the ribbon column and collapse the portion of code.

FIG. 8 depicts an example screenshot 800 showing an edit pane 810 and a ribbon column 820. The ribbon column 820 of this example includes a collapsed code indicator 830. The collapsed code indicator 830 can include, for example, an ellipsis indicating a portion of the program code has omitted. Moreover, the edit pane 810 includes an indicator of the collapsed code, such as, for example an ellipsis. The omitted program code, while not appearing on the screen, can be saved in memory such that it can be restored later. Omission of segments of program code can make the program code easier to read and debug.

Figure 9:
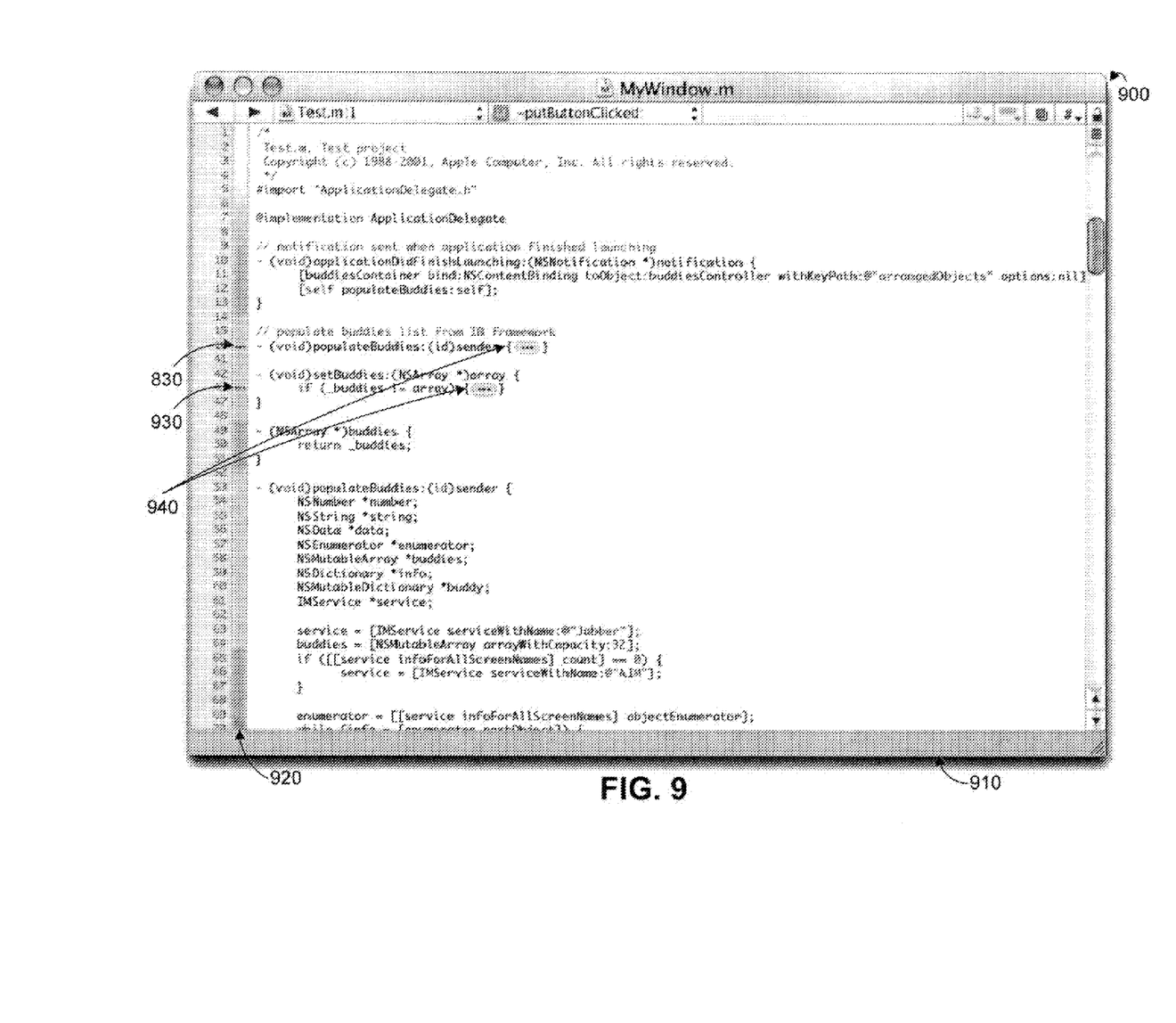
FIG. 9 is a screenshot illustrating an example of a program code editing system whereby a programmer can select a second portion of code based upon the ribbon column and collapse a second portion of code.

FIG. 9 depicts an example screenshot 900 showing an edit pane 910 and a ribbon column 920. The ribbon column 920 of this example includes a first collapsed code indicator 830 and a second collapsed code indicator 930. In this example, a programmer has selected to collapse multiple segments of code. Edit pane 910 includes indicators 940, which indicate the collapsed segments of program code. The indicator, in this example edit pane 910, is put into the argument portion of a statement or procedure call. Again, the omitted program code, while not appearing on the screen, can be saved in memory such that it can be restored later.

Figure 10:
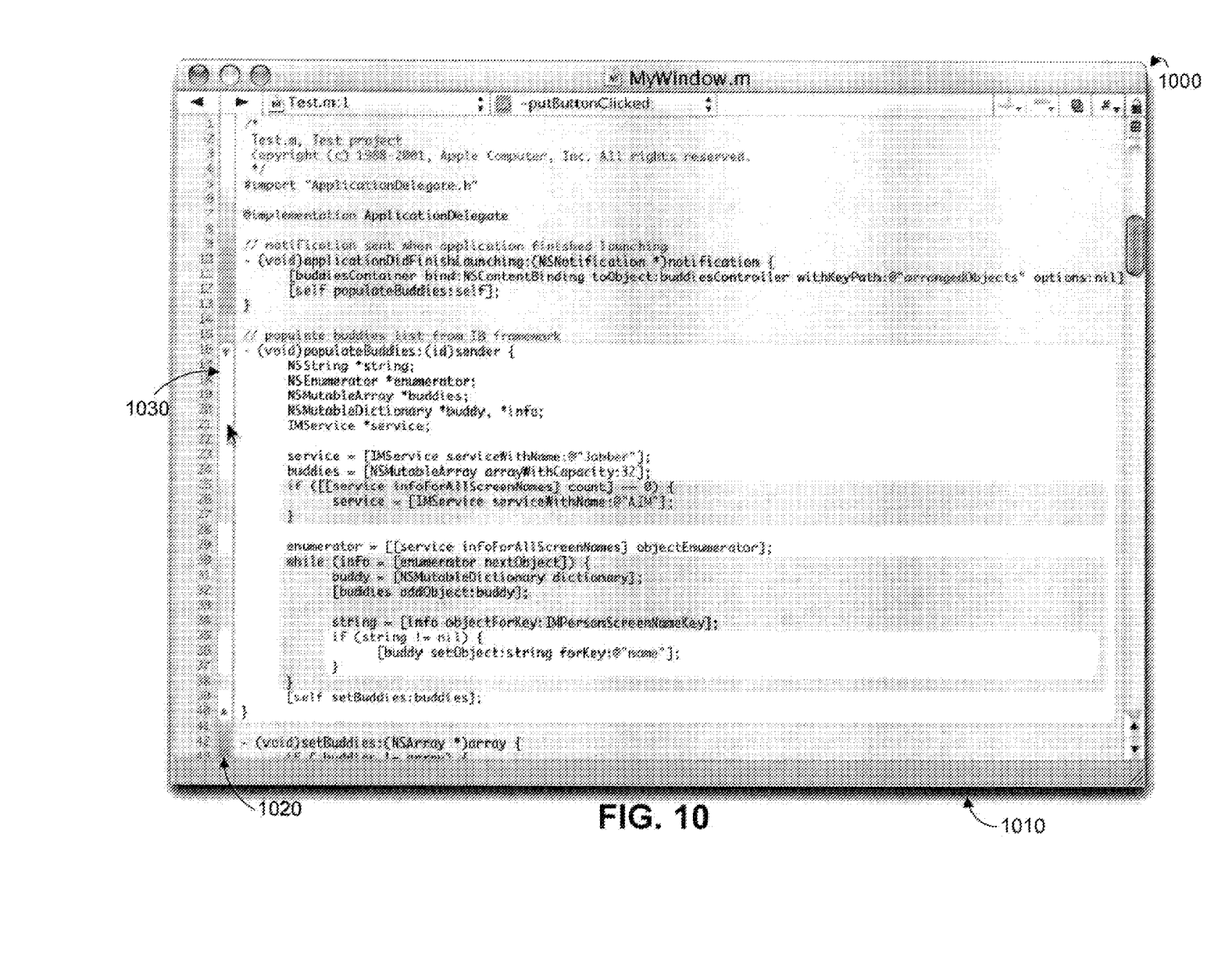
FIG. 10 is a screenshot illustrating an example of a program code editing system whereby a programmer can expand previously collapsed code portion(s).

FIG. 10 depicts an example screenshot 1000 of a program code editing system including an edit pane 1010 and a ribbon column 1020. In this example, the collapsed code from FIGS. 8 and 9 are expanded such that the code reappears in the edit pane 1010. Moreover, a portion of the program code has been selected for editing in the screenshot 1000. The portion of program code selected for editing is indicated by the edit selection indicator 1030 in the ribbon column 1020. Edit selection indicator 1030 includes shading within the edit selection indicator 1030 to depict that the selected segment of code includes sub-segments of code that have a lower depth than the selected depth. Furthermore, the edit pane 1010 includes an graphical indication of which segment/sub-segment of program code is selected for editing. In this example, the segment of code selected for editing is indicated in the edit pane 1010 by a light section of program code in the edit pane 1010. Moreover, sub-segments of program code deeper than the selected depth are indicated by indented shading in this example.

The systems and methods disclosed herein may use data signals conveyed using networks (e.g., local area network, wide area network, internet, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subrouting unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

These and other implementations are within the scope of the following claims.

What is claimed is:

1. A method comprising:
providing an editing pane for editing program code of a program, the program code including an indicator for marking a depth associated with various segments of the program code, wherein the editing pane displays only a portion of the program code of the program;
generating a ribbon column based upon the portion of the program code displayed in the editing pane, the ribbon column including a graphical representation of the depth of only the corresponding segments of the portion of the program code displayed in the editing pane;
displaying the ribbon column and the editing pane such that the graphical representation of the depth of the corresponding segments of the portion of the program code is aligned with the corresponding segments of the program code displayed in the editing pane; and
displaying the ribbon column and the editing pane aligned, wherein the generating, aligning, and displaying are performed by one or more computers.

2. The method of claim 1, wherein the indicator is an indentation associated with a line of program code.

3. The method of claim 1, wherein the ribbon column is color coded to show depth associated with a particular segment of program code.

4. The method of claim 3, wherein darker colors indicate a lower depth and lighter colors indicate a higher depth associated with the particular segment of program code.

5. The method of claim 3, wherein lighter colors indicate a deeper depth and lighter colors indicate a shallow depth associated with the particular segment of program code.

6. The method of claim 3, wherein the color coding is in gray scale.

7. The method of claim 1, further comprising:
receiving a selection from a programmer, the selection being associated with at least a portion from the ribbon column; and
enabling an edit portion of the editing pane responsive to the selection.

8. The method of claim 7, wherein the edit portion of the editing pane comprises a segment of program code associated with the selected portion of the ribbon column.

9. The method of claim 8, wherein the selection enables editing at a selected lower depth.

10. The method of claim 9, further comprising:
color coding segments of code displayed in the editing pane based upon depth associated with the segments of code.

11. The method of claim 1, further comprising:
receiving a request from a programmer to collapse a portion of program code; and
collapsing the portion of program code in the editing pane including displaying a symbol in an associated portion of the ribbon column indicating the portion of program code.

12. The method of claim 11, wherein the request to collapse the portion of code is based upon receiving a selected depth from the programmer which causes program code at the selected depth and lower to be included in the portion of the program code to be collapsed.

13. The method of claim 1, further comprising:
analyzing a structure associated with the program code; and
assigning a depth to segments of the program code.

14. A system, comprising:
one or more computers; and a computer-readable medium coupled to the one or more computers having instructions stored thereon which, when executed by the one or more computers, cause the one or more computers to perform operations comprising:

providing an editing pane for editing program code of a program, the program code including an indicator for marking a depth associated with various segments of the program code, wherein the editing pane displays only a portion of the program code of the program;

generating a ribbon column based upon the portion of the program code displayed in the editing pane, the ribbon column including a graphical representation of the depth of only the corresponding segments of the portion of the program code displayed in the editing pane; and displaying the ribbon column and the editing pane such that the graphical representation of the depth of the corresponding segments of the portion of the program code is aligned with the corresponding segments of the program code displayed in the editing pane; and displaying the ribbon column and the editing pane aligned.

15. The system of claim 14, wherein the ribbon column is color coded to show depth associated with a particular segment of program code.

16. The system of claim 15, wherein darker colors indicate a deeper depth and lighter colors indicate a shallow depth associated with the particular segment of program code.

17. The system of claim 15, wherein lighter colors indicate a deeper depth and lighter colors indicate a shallow depth associated with the particular segment of program code.

18. The system of claim 15, wherein the color coding is in gray scale.

19. The system of claim 14, wherein the editing pane and ribbon column are operable to receive a selection from a programmer, the selection being associated with at least a selected portion of the ribbon column, wherein an editing pane editor enables an edit portion of the edit pane responsive to the selection.

20. The system of claim 19, wherein the operations further comprise:

enabling editing of a selected segment of program code, the selected segment of program code being a portion of the ribbon column selected by the programmer.

21. The system of claim 20, wherein the selection enables editing at a selected lower depth.

22. The system of claim 14, wherein the operations further comprise:

color coding the program code displayed in the edit pane based upon the depth associated with the program code.

23. The system of claim 14, wherein the operations further comprise:

receiving a request to collapse a portion of program code; and collapsing the portion of the program code in the edit pane with a symbol representing omitted program code.

24. The system of claim 23, wherein the operations further comprise:

replacing a ribbon segment associated with the collapsed portion of the program code with a symbol representing omitted program code.

25. The system of claim 23, wherein the request to collapse a portion of code is based upon receipt of a selected ribbon column point, an edit pane generator thereby causing program code at a depth associated with the selected ribbon column point and any lower depths to be included in the program code to be replaced by the symbol.

26. Computer readable media comprising instructions that upon execution by a system processor cause the system processor to perform steps comprising:

providing an editing pane for editing program code of a program, the program code including an indicator for marking a depth associated with various segments of the program code, wherein the editing pane displays only a portion of the program code of the program;

generating a ribbon column based upon the portion of the program code displayed in the editing pane, the ribbon column including a graphical representation of the depth of only the corresponding segments of the portion of the program code displayed in the editing pane;

displaying the ribbon column and the editing pane such that the graphical representation of the depth of the corresponding segments of the portion of the program code is aligned with the corresponding segments of the program code displayed in the editing pane; and displaying the ribbon column and the editing pane aligned.

* * * * *

UNITED STATES PATENT AND TRADEMARK OFFICE
CERTIFICATE OF CORRECTION

| | |
|---|---|
| PATENT NO. | : 7,805,705 B2 |
| APPLICATION NO. | : 11/462628 |
| DATED | : September 28, 2010 |
| INVENTOR(S) | : Christopher Espinosa et al. |

It is certified that error appears in the above-identified patent and that said Letters Patent is hereby corrected as shown below:

In column 2, line 5, after "program" insert -- code --.

In column 2, line 10, after "pane" insert -- . --.

In column 3, line 22, delete "receiver" and insert -- receive --, therefor.

In column 3, line 29, delete "125." and insert -- 135. --, therefor.

In column 3, line 33, delete "generation" and insert -- generator --, therefor.

In column 3, line 49, delete "a ribbon" and insert -- the ribbon --, therefor.

In column 3, line 61, delete "tow" and insert -- row --, therefor.

In column 4, line 7, delete "hors" and insert -- hours --, therefor.

In column 4, line 17, delete "IN" and insert -- In --, therefor.

In column 4, line 31, delete "and" and insert -- an --, therefor.

In column 4, line 45, delete "14)," and insert -- 140), --, therefor.

In column 4, line 61, after "code." insert -- Alternatively, less intense colors can be used to indicate a deeper segment of program code, while more intense colors can indicate a shallower segment of program code. --.

In column 5, line 24, delete "IN" and insert -- In --, therefor.

In column 5, line 42, delete "IN" and insert -- In --, therefor.

Signed and Sealed this
Twenty-ninth Day of November, 2011

David J. Kappos
*Director of the United States Patent and Trademark Office*

CERTIFICATE OF CORRECTION (continued)
U.S. Pat. No. 7,805,705 B2

In column 5, line 56, delete "coded" and insert -- code --, therefor.

In column 6, line 8, delete "no" and insert -- not --, therefor.

In column 6, line 14, delete "400" and insert -- 500 --, therefor.

In column 6, line 40, delete "coded" and insert -- code --, therefor.

In column 6, line 45, delete "ode" and insert -- code --, therefor.

In column 6, line 45, delete "depth that" and insert -- depth than --, therefor.

In column 7, line 59, delete "subrouting" and insert -- subroutine --, therefor.